(12) United States Patent
Wang et al.

(10) Patent No.: US 7,282,269 B2
(45) Date of Patent: Oct. 16, 2007

(54) CURED RUBBER COMPONENTS FOR USE WITH PHARMACEUTICAL DEVICES

(75) Inventors: Hsien-Chang Wang, Bellaire, TX (US); Wai Keung Wong, Wezembeek-Oppem (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 337 days.

(21) Appl. No.: 10/476,550

(22) PCT Filed: Apr. 8, 2002

(86) PCT No.: PCT/US02/11069

§ 371 (c)(1),
(2), (4) Date: Oct. 31, 2003

(87) PCT Pub. No.: WO02/098927

PCT Pub. Date: Dec. 12, 2002

(65) Prior Publication Data

US 2004/0180163 A1    Sep. 16, 2004

Related U.S. Application Data

(60) Provisional application No. 60/295,759, filed on Jun. 4, 2001.

(51) Int. Cl.
*B25B 25/20*    (2006.01)
(52) U.S. Cl. .................. 428/447; 528/901; 525/100
(58) Field of Classification Search ........... 428/447; 528/901; 525/100
See application file for complete search history.

(56) References Cited

U.S. PATENT DOCUMENTS

| 4,160,759 A | 7/1979 | Gardner et al. ........... 260/40 R |
| 4,245,060 A | 1/1981 | Powers et al. ............ 525/256 |
| 4,756,974 A | 7/1988 | Romberg ................ 428/423.9 |
| 4,766,193 A * | 8/1988 | Nakasuji et al. ............. 528/17 |
| 5,013,793 A | 5/1991 | Wang et al. ............... 525/195 |
| 5,051,477 A | 9/1991 | Yu et al. .................. 525/194 |
| 5,125,921 A | 6/1992 | Duschek .................. 604/415 |
| 5,162,445 A | 11/1992 | Powers et al. |
| 5,163,919 A | 11/1992 | Thijs et al. ............... 604/199 |
| 5,279,606 A | 1/1994 | Haber et al. .............. 604/403 |
| 5,340,118 A | 8/1994 | Jacobson et al. ........... 273/411 |
| 5,428,085 A | 6/1995 | Burel et al. ............... 524/59 |
| 5,656,112 A | 8/1997 | Kuroda .................... 156/69 |
| 5,698,640 A | 12/1997 | Duvdevani et al. ...... 525/333.4 |
| 5,782,815 A | 7/1998 | Yanai et al. ............... 604/218 |
| 5,823,373 A * | 10/1998 | Sudo et al. ................ 215/249 |
| 5,959,049 A | 9/1999 | Powers et al. ............ 526/185 |
| 5,994,465 A | 11/1999 | Sudo et al. ............... 525/105 |
| 6,129,712 A * | 10/2000 | Sudo et al. ............... 604/218 |
| 6,177,519 B1 | 1/2001 | Chung et al. .............. 525/263 |
| 6,624,220 B1 * | 9/2003 | Waddell et al. ........... 524/265 |
| 6,875,813 B2 | 4/2005 | Tsou et al. |

FOREIGN PATENT DOCUMENTS

| EP | 0 474 406 | 3/1992 |
| EP | 0 841 374 | 5/1998 |
| WO | WO 99 31178 | 6/1999 |
| WO | WO 00 52072 | 9/2000 |
| WO | WO 00 52073 | 9/2000 |

OTHER PUBLICATIONS

The American Heritage Dictionary of the English Language, 4th Ed., Houghton Mifflin Company, 2000, p. 1570.*
U.S. Appl. No. 09/260,456, entitled "Polyisobutylene Copolymers Having Reactive Silyl Grafts", filed Mar. 2, 1999, "allowed".

* cited by examiner

*Primary Examiner*—Kuo-Liang Peng
(74) *Attorney, Agent, or Firm*—Leandro Arechederra, III; Xiaobing Feng

(57)    ABSTRACT

Pharmaceutical containers containing at least one shaped component serving as a sealing barrier such as closure, stopper or plunger, for the contents of the container are disclosed. Such sealing barriers are made from elastomeric compositions containing a silylated copolymer of isobutylene/isoprene (butyl rubber) and para-methylstyrene which are curable by contact with moisture.

21 Claims, 1 Drawing Sheet

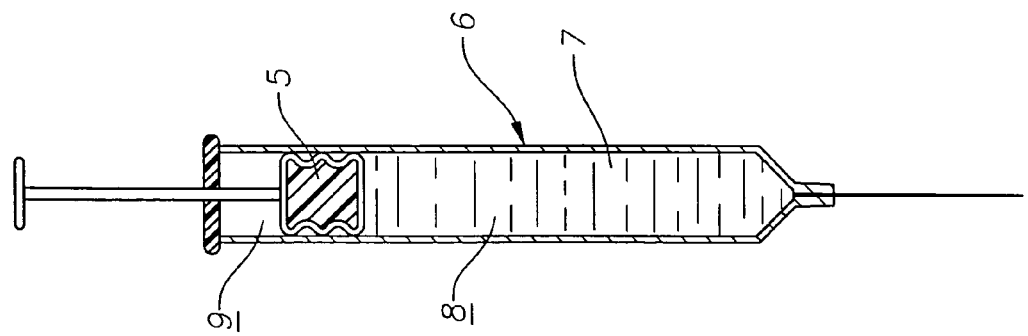
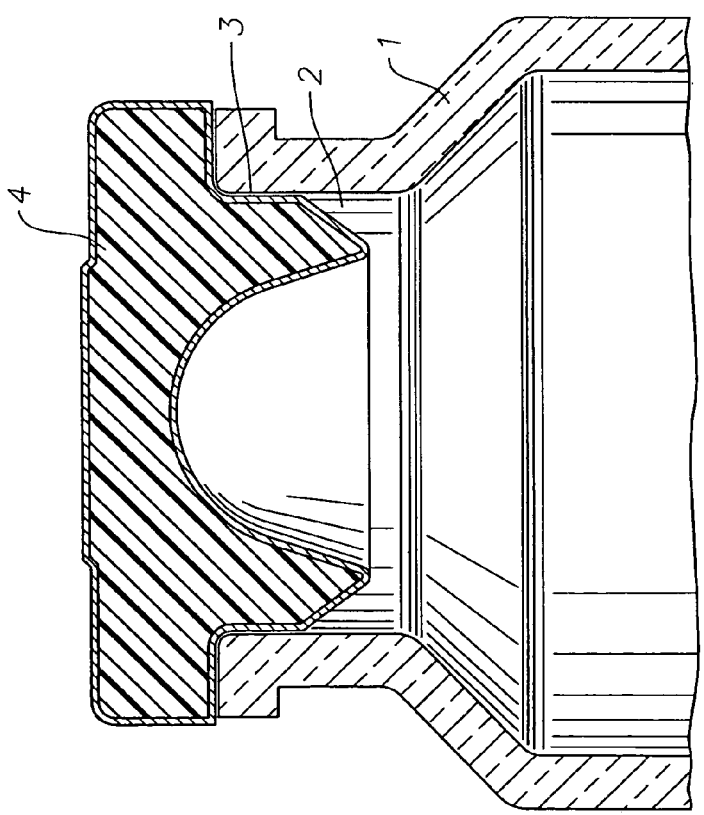

CURED RUBBER COMPONENTS FOR USE WITH PHARMACEUTICAL DEVICES

CROSS REFERENCE TO RELATED APPLICATIONS

This application is a National Stage Application of International Application No. PCT/US02/11069, filed Apr. 8, 2002, which claims the benefit of Provisional Application No. 60/295,759, filed Jun. 4, 2001.

FIELD OF THE INVENTION

The present invention relates to cured rubber components useful in pharmaceutical devices such as stoppers, plungers, medicine-containing vials and syringes.

BACKGROUND

Butyl rubber (copolymers of isobutylene with up to 20 wt % isoprene) and halogenated butyl rubber are often the materials of choice for use as sealing barriers for pharmaceutical containers. Such sealing barriers include stoppers, diaphragms, gaskets and pistons for use with vials, cartridges, syringes and the like. Butyl rubber exhibits superior properties in terms of air and moisture impermeability, resistance to chemical attack and heat resistance, as well as good processability, which are all desirable properties for pharmaceutical packaging.

One of the more important applications for butyl rubber is its use as a rubber stopper in glass or high density plastic vials. This affords relatively safe storage of medicines and easy access to the medicine by piercing the stopper with a needle cannula, removal of the vial contents and removal of the needle cannula from the stopper after which the vial is resealed due to the resilient nature of the rubber.

In other applications molded butyl rubber parts are used as components of plungers or pistons in syringes used to inject medicine into the body.

Of critical importance with respect to these uses is that the rubber must not only be resistant to chemical attack by the contents of the container with which it comes in contact, but it must also not contaminate the container contents by virtue of a leaching out of ingredients present in the cured rubber part. In the case of butyl rubber and other rubbers used for these applications, contamination sources would include vulcanizing agents required to cure the rubber, such as zinc or magnesium oxide, sulfur, sulfur-containing vulcanization accelerators, fatty acids, peroxides and the like. Some of these sources may contaminate certain medicines either directly or by catalyzing unwanted reactions in the medicine.

Compositions including copolymers of vinyl aromatic monomers have been disclosed as useful for some sealing applications, such as in WO 99 31178; WO 00 52072; and EP 0 474 406 A2. However, it has not been shown that these copolymers are useful as pharmaceutical seals, where avoidance of contamination is desirable. What is needed is an improved composition having excellent sealing properties, while avoiding contamination of stored materials.

SUMMARY OF THE INVENTION

The present invention provides for sealing barriers for use in medical packaging which barriers comprise a cured isobutylene/vinyl aromatic copolymer composition which is free of many of the rubber curatives which potentially may contaminate the contents of the packaging.

More specifically, the invention provides a pharmaceutical container adapted for storage and/or delivery of medical or pharmaceutical preparations, the container including at least one shaped component serving as a sealing barrier for the contents of the container, the component comprising a moisture cured silylated isobutylene copolymer composition which is the product of contacting:

a) an elastomeric copolymer selected from halogenated or non-halogenated copolymers of isobutylene with up to 15 wt % of at least one $C_4$ to $C_{14}$ conjugated diene and halogenated or non-halogenated copolymers of isobutylene with up to 20 wt % of at least one vinyl aromatic monomer;

b) a silane of the general formula:

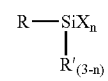

wherein R is an alkenyl group having 2 to 10 carbon atoms, R' is independently selected from hydrocarbon or halogenated hydrocarbon groups which contain no aliphatic unsaturation, X is a silicon-bonded hydrolyzable group selected from alkoxy, acyloxy, ketoxime, amino, amido, aminoxy or alkenyloxy group, and n is 2 or 3, and c) a free radical generating agent.

Sealing barriers may be prepared by forming the composition into the desired shape by suitable molding techniques and contacting the shape with moisture sufficient to crosslink (cure) the shaped article.

BRIEF DESCRIPTION OF THE DRAWINGS

FIG. 1 is a partial cross-sectional view of one embodiment of a pharmaceutical container provided with a pharmaceutical stopper.

FIG. 2 is a cross sectional view of another embodiment of a pharmaceutical container provided with a plunger.

DETAILED DESCRIPTION OF THE INVENTION

The silylated copolymers of the invention may be characterized as the addition product of an isobutylene copolymer radical created by contact of the copolymer with a free radical generating agent and an olefinically unsaturated, hydrolyzable silane wherein the silane adds to the polymer backbone to produce a silane grafted or silane modified copolymer product. In particular, an embodiment of the invention is a pharmaceutical container which is the product of contacting an isobutylene-vinyl aromatic based polymer with a silane cross-linking agent.

The polymer suitable for the pharmaceutical containers of the invention include copolymers containing at least 80 wt % of isobutylene derived units and from 0.1 up to 20 wt % of at least one vinyl aromatic derived unit. Preferred vinyl aromatic monomers are mono-vinyl aromatics such as styrene, α-methylstyrene, alkyl-substituted styrenes such as t-butylstyrene and para-alkyl substituted styrenes wherein the alkyl group contains from 1 to 4 carbon atoms, more preferably para-methylstyrene.

One embodiment of the copolymers include elastomeric copolymers comprising isobutylene and para-methylstyrene and containing from 0.1 to 20 wt % of para-methylstyrene. These copolymers (hereinafter referred to as IPMS) have a substantially homogeneous compositional distribution such that at least 95% by weight of the polymer has a para-methylstyrene content within 10% of the average para-methylstyrene content of the polymer. They are also characterized by a narrow molecular weight distribution (Mw/Mn) of less than 5, more preferably less than 3.5, and a glass transition temperature ($T_g$) of below −50° C. Further, the copolymers are characterized by a Mooney Viscosity (ML 1+8) at 100° C. of from 35 to 55 in one embodiment, and from 38 to 50 in another embodiment.

In another embodiment of the invention, the isobutylene copolymer of the present invention may be terpolymer of a $C_4$ to $C_7$ isoolefin and a para-alkylstyrene and halogenated para-alkylstyrene. The percentages of para-alkylstyrene and halogenation can vary widely. Different applications may require different formulations. Generally, the copolymer of the present invention will have from 2 wt % to 20 wt % para-alkylstyrene (preferably para-methylstyrene). In addition, the copolymer of the present invention will have from 0.20 mol % to 3.0 mol % of a halogenated compound, such as bromo para-methylstyrene.

Relatively low levels of either bromine and/or para-alkylstyrene are used in one embodiment. In one embodiment, para-alkylstyrene (preferably para-methylstyrene) comprises from 3 wt % to 15 wt % of the copolymer. More preferably, it is from 4 wt % to 7.5 wt % of the copolymer. In another preferred embodiment, a halogenated compound, such as para-bromomethylstyrene comprises from 0.20 mol % to 3.0 mol % of the copolymer. More preferably, it comprises from 0.50 mol % to 1.5 mol % of the copolymer. In another embodiment, the level of para-bromomethylstyrene is from 0.5 mol % to 1.0 mol % of the copolymer.

These copolymers may be prepared by conventional cationic polymerization of the monomer mixture using a Lewis Acid catalyst and are more particularly disclosed in U.S. Pat. No. 5,162,445. A commercial embodiment of this type of copolymer is XP-50 Elastomers and EXXPRO™ Elastomers (ExxonMobil Chemical Company, Houston Tex.).

Another category of isobutylene copolymer which may be used is a copolymer of 85 to 99.5 wt % of isobutylene with 15 to 0.5 wt % of $C_4$ to $C_{14}$ conjugated diene. Such copolymers are well known in the art and are also referred to as "butyl rubber." Typical conjugated dienes may be illustrated by isoprene, butadiene, 2,3-dimethyl butadiene, piperylene, 2,5-dimethylhexa-2,4-diene, cyclopentadiene, cyclohexadiene and methylcyclopentadiene. It is preferred that the copolymer is a copolymer of isobutylene with isoprene, the latter monomer preferably being present at a level of 0.5 to 4 wt %, most preferably at 2 to 3 wt %.

Typically, the isobutylene copolymers have a number average molecular weight ($M_n$) of 5,000 to 500,000, preferably greater than 50,000, more preferably 100,000 to 300,000, before being modified according to the method described below.

Halogenated isobutylene copolymers containing from 0.1 to 5 wt % bromine or chlorine may also be used for the purposes of this invention, although the presence of halogen is not necessary for the purposes of curing the copolymer.

The unsaturated silane which is grafted to the copolymer backbone has the general formula

wherein R is an alkenyl group having 2 to 10 carbon atoms which may be illustrated by vinyl, allyl, butenyl, pentenyl, hexenyl, heptenyl, octenyl and decenyl. Either straight chain or branched groups may be used but the unsaturation is a vinylic type (i.e., having a terminal unsaturated moiety; an alkenyl) in a desirable embodiment. Preferred alkenyl groups are vinyl, allyl and hexenyl. R' may be independently selected from hydrocarbon or halogenated hydrocarbon groups which contain no aliphatic unsaturation. These may be specifically exemplified by alkyl groups having 1 to 20 carbon atoms, such as methyl, ethyl, propyl, butyl, pentyl, hexyl, octyl, decyl and dodecyl; cycloalkyl groups, such as cyclohexyl and cycloheptyl; aryl groups having 6 to 12 carbon atoms, such as phenyl, tolyl and xylyl; aralkyl groups having 7 to 20 carbon atoms, such as benzyl and phenyl-ethyl; halogenated alkyl groups having 1 to 20 carbon atoms, such as 3,3,3-trifluoropropyl and chloromethyl; and halogenated aryl groups having 6 to 12 carbon atoms, such as chlorobenzyl or chloronaphthyl. X in the above formula is a silicon-bonded hydrolyzable group selected from alkoxy, acyloxy, ketoxime, amino, amido, aminoxy or alkenyloxy groups, and preferably contains no more than 6 carbon atoms. Specific examples of such hydrolyzable groups include methoxy, ethoxy, propoxy, butoxy, acetoxy, propionoxy, —ON═C(ME)$_2$, —ON═C(Et)(Me), —ON═C(Ph)$_2$, —NH(Me), —NH(Et) and —NH(Ph)$_2$, wherein Me, Et and Ph hereinafter denote methyl, ethyl and phenyl groups, respectively.

Preferably, X is an alkoxy group having 1 to 4 carbons, most preferably a methoxy group. The subscript n is an integer having a value of 2 or 3. Desirable silanes are methylvinyldimethoxysilane, vinyltrimethoxysilane and hexenyltrimethoxysilane.

Radiation such as an electron beam generator or an organic compound may be used to generate free radicals. The type of free-radical generator used in the method of the present invention is not specifically limited. The organic component generates free radicals upon heating and may be selected from any of the known azo or diazo compounds, such as 2,2'-azobisisobutyronitrile and phenyl-azo-triphenylmethane. Preferably, the free-radical generator is selected from organic peroxides such as hydroperoxides, diacyl peroxides, ketone peroxides, peroxyesters, dialkyl peroxides, diaryl peroxides, aryl-alkyl peroxides, peroxydicarbonates, peroxyketals, peroxy acids, acyl alkylsulfonyl peroxides and alkyl monoperoxydicarbonates.

Specific examples of suitable peroxides which may be used according to the method of the present invention include benzoyl peroxide, t-butyl peroxy o-toluate, cyclic peroxyketal, t-butyl hydroperoxide, t-butyl peroxypivaiate, lauroyl peroxide and t-amyl peroxy 2-ethylhexanoate, 1,3-bis(t-butylperoxyisopropyl) benzene, 2,2,4-trimethylpentyl-2-hydroperoxide, 2,5-bis(t-butylperoxy)-2,5-dimethylhexyne-3, cumyl hydroperoxide, t-butyl peroxybenzoate and disopropylbenzene mono hydroperoxide. For the purposes of the process of the invention, it is preferred that the peroxide is selected from dicumyl peroxide and di-t-butyl peroxide.

In order to produce a modified copolymer according to the instant method, the copolymer is contacted with a silane in the presence of a free-radical generator in a suitable reaction zone and under reaction conditions to produce a graft of the silane along the polymer backbone. Where the copolymer contains a vinyl aromatic monomer, for example, para-methylstyrene, it is believed that most of the grafting takes place on the aromatic ring and thus little degradation of the isobutylene chain segments takes place via chain scission.

Where the copolymer contains a conjugated diene (butyl rubber), there is some degradation of the chains occasioned by chain scission during the grafting process leading to a reduction in the Mn of the graft polymer product as compared with the starting polymer product.

The contacting of the components (or "grafting reaction") may be conducted in the absence of a diluent or in the presence of a diluent. Where a diluent is present in the reaction zone, suitable diluents include saturated aliphatic hydrocarbons, aromatic hydrocarbons, and perhalogenated hydrocarbons.

The grafting reaction to produce the grafted polymer of the present invention may also be conducted in the absence of a diluent and in the bulk phase, wherein the copolymer is in the molten state. The reaction temperature is chosen to be appropriate for the free radical generator used.

Suitable conditions for contacting the various components include a temperature ranging from about 0° C. to about 300° C. The reaction temperature will vary according to the free radical generator used. When an organic peroxide is used, suitable temperatures range from about 25° to about 250° C. Higher temperatures may be used for other types of free radical initiators. When the reaction is conducted in the presence of a diluent, such as in solution processes, the reaction temperature will generally be below 150° C. For melt phase processes (i.e., bulk phase processes), the reaction temperature may range from about 25° C., such as in conventional electron beam irradiation equipment to about 250° C., such as in polymer mixing equipment. The process for producing the grafted polymers of the present invention may be conducted as a batch process or as a continuous process.

The reaction is performed in a suitable reaction zone which may be a polymer mixing device such as a Banbury™ mixer, a single or multiple screw extruder and the like for molten polymers or a glass flask, metal tank or tube when the process is conducted in the presence of a diluent.

The molar ratio of free radical compound vs. silane used in the grafting reaction may range from 0.001:1 to 1:1, preferably from 0.01:1 to 0.1:1.

Desirably, the molar amount of silane, expressed in mmoles per gram, in the contacting zone may be 1 to 10 times the molar amount of these components as is desired in the final grafted copolymer. Thus, when the molar amount of the silane in the grafted copolymer is 0.05 mmoles per gram of product polymer, the amount of silane introduced in the reaction zone is suitably from 0.05 to 0.5 mmoles per gram of the total of the copolymer and silane present in the reaction mixture.

Preferably the grafting reaction is conducted such that the resulting silylated copolymers contain an average of from 0.5 to 15 moles, more preferably from 1 to 5 moles of hydrolyzable silyl groups per molecular chain, as measured by $^1$HNMR.

Crosslinking of the copolymers is conducted via a condensation reaction between silane molecules grafted onto different polymer chains. Thus, conventional curatives such as zinc oxide, sulfur or sulfur-containing accelerators are not necessary to effect curing of the composition, but may be present in an alternative embodiment. Thus, in one embodiment of the invention, these additives—metal oxides, sulfur, sulfur-containing accelerators—are absent from the composition, and present in the composition/elastomeric article to less than 0.5 wt % (combined) in another embodiment.

The silylated copolymers of the present invention may be cured by contact with or mixing with water (moisture), preferably in the presence of a silanol condensation catalyst.

By contacting with moisture or water, it is meant that the copolymer composition is contacted uniformly to liquid water, a solution containing water, or gaseous water at any suitable level to effectuate the cure. For example, in one embodiment, typical atmospheric levels of moisture are suitable levels of gaseous water to effectuate a cure. Suitable condensation catalysts include metal carboxylates such as dibutyltin dilaurate, stannous octoate, stannous acetate, lead naphthenate and zinc octoate; organic metal compounds such as titanium esters and chelates such as tetrabutyl titanate; organic bases such as ethylamine, hexylamine and piperidine; and acids such as mineral acids and fatty acids. Preferred catalysts are organic tin compounds such as dibutyltin dilaurate and stannous octoate. The amount of catalyst employed will generally range from 0.1 to 10 parts by weight per 100 parts by weight of silylated copolymer.

The composition may also contain other additives known in the rubber formulation art such as fillers and processing oils. Suitable fillers include carbon black, talc, silica and the like. Suitable processing oils include paraffinic or aromatic oils. The composition may also comprise a mixture of one or more non-silylated isobutylene polymers or copolymers, such as isobutylene/para-methylstyrene or isoprene copolymers, which may or may not be halogenated. Suitable amounts of conventional curatives for these curable copolymers may also be included. In one embodiment, processing oils such as parraffinic, naphthenic, aromatic, mineral and other oils are substantially absent, meaning that they are present, if at all, to an extent no greater than 5 phr in one embodiment, and less than 3 phr in another embodiment, and less than 1 phr in yet another embodiment, and not present to a measurable extent in another embodiment.

One embodiment of the invention is a pharmaceutical container adapted for storage and/or delivery of medical or pharmaceutical preparations, the container including at least one shaped component serving as a sealing barrier for the contents of the container, the component comprising a moisture cured silylated isobutylene copolymer composition which is product of contacting: an elastomeric copolymer selected from halogenated or non-halogenated copolymers of isobutylene with up to 15 wt % of at least one $C_4$ to $C_{14}$ conjugated diene and halogenated or non-halogenated copolymers of isobutylene with up to 20 wt % of at least one vinyl aromatic monomer; a silane of the general formula:

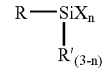

wherein R is an alkenyl group having 2 to 10 carbon atoms, R' is independently selected from hydrocarbon or halogenated hydrocarbon groups, wherein R' groups may contain no aliphatic unsaturation in one embodiment; X is a silicon-bonded hydrolyzable group selected from alkoxy, acyloxy, ketoxime, amino, amido, aminoxy or alkenyloxy group, and n is 2 or 3, and a free radical generating agent.

Another embodiment of the invention is a pharmaceutical container adapted for storage and/or delivery of medical or pharmaceutical preparations, the container including at least one shaped component serving as a sealing barrier for the contents of the container, the component consisting essentially of an elastomeric copolymer selected from halogenated or non-halogenated copolymers of isobutylene with up to 15 wt % of at least one $C_4$ to $C_{14}$ conjugated diene and halogenated or non-halogenated copolymers of isobutylene with up to 20 wt % of at least one vinyl aromatic monomer; a silane of the general formula:

wherein R is an alkenyl group having 2 to 10 carbon atoms, R' is independently selected from hydrocarbon or halogenated hydrocarbon groups, wherein R' may contain no aliphatic unsaturation in one embodiment; X is a silicon-bonded hydrolyzable group selected from alkoxy, acyloxy, ketoxime, amino, amido, aminoxy or alkenyloxy group, and n is 2 or 3, and a free radical generating agent, wherein the components are combined and contacted with moisture in order to effectuate a cure. This and other embodiments may include variations of the copolymer, wherein the para-methylstyrene is present in the copolymer from 4 to 7.5 wt % of the copolymer in one embodiment, and wherein 0.5 to 1.5 mol % of the para-methylstyrene derived units are halogenated in another embodiment.

The copolymer, silane, and free radical generating agent are contacted in the presence of moisture or water for 9 days or less in one embodiment, for 11 days or less in another embodiment, for 15 days or less in yet another embodiment, from 1 hr. to 30 days in one embodiment, and from 5 to 15 days in another embodiment, and from 9 to 11 days in yet another embodiment to effectuate a cure.

As indicated above, the moisture-cured composition of the invention is suitable for use as one or more components of pharmaceutical containers which are designed for the storage and/or delivery of medical or pharmaceutical preparations which are to be injected into a human or animal body. Because the cured rubber does not contain the various chemical additives normally required to cure conventional rubbers such as butyl or halobutyl rubber, the risk of possible contamination of these preparations by virtue of contact with leaching curatives is markedly reduced. Also, the risk of canula contamination by chemicals normally present in cured conventional rubbers is also markedly reduced.

Suitable components of pharmaceutical containers include closures for parenteral (I.V.) vials, closures for injection vials, closures for vials containing freeze dried pharmaceutical products, closures for blood collection tubes or other diagnostic tubes, plungers and plunger tips for syringes, discs and gaskets, intravenous drug delivery components and like applications. Typical applications for these cured rubber components may be found in U.S. Pat. Nos. 4,756,974, 5,163,919, 5,125,921, 5,279,606, 5,656,112 and 5,782,815.

One embodiment of a pharmaceutical container is shown in FIG. 1. In particular, FIG. 1 shows a typical application where the cured rubber is used as a stopper for a pharmaceutical vial. Vial 1 provided with opening 2 is sealed along surface 3 with stopper 4, which is adapted to be penetrated by a needle canula for removal of the vial contents.

FIG. 2 shows another application for the cured rubber composition of the invention. The figure shows rubber stopper 5 used as a sealant/plunger means in syringe 6 which has been filled with a pharmaceutical liquid 7. The stopper/plunger 5 can have any shape so long as it sealingly fits within the barrel of syringe 7. The seal that is formed between the stopper and inside walls of the syringe barrel is such that liquid and/or gas does not travel from space 8 to space 9.

A molding composition may be prepared by mixing the silylated copolymer and other additives in a suitable mixing device such as a Banbury™ mixer, an extruder/mixer, a mill mixer or other suitable mixing device at temperatures in the range of about 140°-240° C. The composition is then sheeted out using a roll mixer or calendar with roll temperatures of about 50-100° C. to form shaped sheets having the desired thickness. Alternatively, the mixture may be extruded in the form of sheet material. The sheets are then cut to the desired size which are suitable for further molding to form articles of the desired shape and function. These processing techniques are well known in the rubber processing field.

Shaped parts may be made from these sheets by any suitable molding technique such as compression molding or injection molding.

The shaped parts may be cured simply by exposure to moisture, for example water, for a period of time sufficient to provide the desired degree of crosslinking, usually from about 1 hour to 30 days or more. Moisture exposure at temperatures ranging from ambient up to 120° C. may be conducted in a steam autoclave, moisture saturated chamber or by direct contact with steam or immersion in water. Sterilization of the parts by the manufacturer prior to assembly of the pharmaceutical container can be combined with the crosslinking process.

The following example is illustrative of the invention.

EXAMPLE 1

A silylated copolymer was prepared by mixing 96.8 parts by weight of a copolymer of isobutylene and 5 wt % of para-methylstyrene, 0.2 parts by weight of di-t-butyl peroxide (dispersion in mineral oil) and 3 parts by weight vinyl-trimethoxy silane and heating the mixture under high shear conditions at a temperature in the range of 160°-220° C. The resulting silylated copolymer had a number average molecular weight (Mn) of 98,100, a weight average molecular weight (Mw) of 230,000 and a polydispersity value of 2.35. The content of the grafted trimethoxy silane was 0.59 wt %.

The resulting extruded material was compounded on calendar rolls at 50° C. at which time 0.59 wt % of dibutyl tin dilaurate condensation catalyst was dispersed in the mixture. The composition was sheeted out to form sheets which were further cut to form shaped discs.

Curing was then conducted by immersing the discs in water at 50° C. for a period of time. The % volume increase and % extractable values in cyclohexane were evaluated to show the degree of cure vs. time, and are shown in Table 1. The data suggest that higher the degree of crosslinking, the lower the % volume increase and % extractables.

While the present invention has been described and illustrated by reference to particular embodiments, those of ordinary skill in the art will appreciate that the invention lends itself to many different variations not illustrated herein. For these reasons, then, reference should be made solely to the appended claims for purposes of determining the true scope of the present invention.

All priority documents are herein fully incorporated by reference for all jurisdictions in which such incorporation is permitted. Further, all documents cited herein, including testing procedures, are herein fully incorporated by reference for all jurisdictions in which such incorporation is permitted.

TABLE 1

|  | % Extractable | % Volume Increase |
|---|---|---|
| No Cure | 89, 91 | 6134, 7289 |
| 11 days in water at 50° C. | 45, 24 | 3148, 1434 |
| 25 days in water at 50° C. | 29, 32 | 3142, 3231 |

What is claimed is:

1. A pharmaceutical container adapted for storage and/or delivery of medical or pharmaceutical preparations, the container including at least one shaped component serving as a sealing barrier for the contents of the container, the component comprising in direct contact with the contents a moisture cured silylated isobutylene copolymer composition which is the product of contacting:
   a) a copolymer of isobutylene and para-methylstyrene containing from 0.1 to 20 wt % of para-methylstyrene;
   b) a silane of the general formula:

wherein R is an alkenyl group having 2 to 10 carbon atoms, R' is independently selected from hydrocarbon or halogenated hydrocarbon groups, X is a silicon-bonded hydrolyzable group selected from alkoxy, acyloxy, ketoxime, amino, amido, aminoxy or alkenyloxy group, and n is 2 or 3,
   c) a free radical generating agent, and
   d) a processing oil is present, and comprises less than 5 phr based on the component.

2. The container of claim 1, wherein the composition further comprises a silanol condensation catalyst, and wherein the composition is crosslinked by contact with moisture.

3. The container of claim 1, wherein the para-methylstyrene is present in the copolymer from 4 to 7.5 wt % of the copolymer.

4. The container of claim 1, wherein 0.5 to 1.5 mol % of the para-methylstyrene derived units are halogenated.

5. The container of claim 1, wherein the free radical generating agent is an organic peroxide present in the composition at a level of from 0.5 to 10 parts by weight per 100 parts by weight of the elastomeric copolymer.

6. The container of claim 1, wherein silane is selected from methylvinyldimethoxy silane and vinyltrimethoxy silane.

7. The container of claim 1, wherein the process oil is present, and comprises less than 1 phr of the component.

8. The container of claim 1, wherein the silylated copolymers of the component contain from 0.5 to 15 moles of hydrolyzable silyl groups per polymer chain as measured by $^1$H NMR.

9. The container of claim 1, wherein metal oxides, sulfur and sulfur containing accelerators are present in the component to less than 0.5 wt % (combined).

10. The container of claim 1, wherein the component comprises a stopper or closure.

11. The container of claim 1, wherein the component comprises a syringe plunger or piston.

12. A pharmaceutical container adapted for storage and/or delivery of medical or pharmaceutical preparations, the container including at least one shaped component serving as a sealing barrier directly contacting the contents of the container, the component consisting essentially of a moisture cured silylated isobutylene copolymer composition which is product of contacting:
   a) a terpolymer of isobutylene, para-methylstyrene and broom para-methylstyrene containing from 0.1 to 20 wt % of para-methylstyrene;
   b) a silane of the general formula:

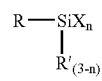

wherein R is an alkenyl group having 2 to 10 carbon atoms, R' is independently selected from hydrocarbon or halogenated hydrocarbon groups which contain no aliphatic unsaturation, X is a silicon-bonded hydrolyzable group selected from alkoxy, acyloxy, ketoxime, amino, amido, aminoxy or alkenyloxy group, and n is 2 or 3,
   c) a free radical generating agent, and
   d) a processing oil is present, and comprises less than 5 phr based on the component.

13. The container of claim 12, wherein, in the moisture cured silylated isobutylene copolymer composition, an additional ingredient of a silanol condensation catalyst is present and wherein the composition is crosslinked by contact with moisture.

14. The container of claim 12, wherein the para-methylstyrene is present in the copolymer from 4 to 7.5 wt % of the copolymer.

15. The container of claim 12, wherein 0.5 to 1.5 mol % of the para-methylstyrene derived units are halogenated.

16. The container of claim 12, wherein the free radical generating agent is an organic peroxide present in the composition at a level of from 0.5 to 10 parts by weight per 100 parts by weight of the elastomeric copolymer.

17. The container of claim 16, wherein the organic peroxide is selected from benzoyl peroxide, t-butyl peroxy o-toluate, cyclic peroxyketal, t-butyl hydroperoxide, t-butyl peroxypivaiate, lauroyl peroxide and t-amyl peroxy 2-ethylhexanoate, 1.3-bis(t-butylperoxyisopropyl) benzene, 2,2,4-trimethylpentyl-2-hydroperoxide, 2,5-bis(t-butylperoxy)-2,5-dimethylhexyne-3, cumyl hydroperoxide, t-butyl peroxybenzoate and disopropylbenzene mono hydroperoxide, and blends thereof.

18. The container of claim 12, wherein silane is selected from methylvinyldimethoxy silane and vinyltrimethoxy silane.

19. The container of claim 12, wherein the component comprises a stopper or closure.

20. The container of claim 12, wherein the component comprises a syringe plunger or piston.

21. The container of claim 12, wherein the silylated copolymers contain from 0.5 to 15 moles of hydrolyzable silyl groups per polymer chain as measured by $^1$H NMR.

* * * * *